(12) United States Patent
Togashi

(10) Patent No.: US 10,884,520 B2
(45) Date of Patent: Jan. 5, 2021

(54) INPUT DETECTING DEVICE

(71) Applicant: SHARP KABUSHIKI KAISHA, Sakai (JP)

(72) Inventor: Yasuyuki Togashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/560,086

(22) Filed: Sep. 4, 2019

(65) Prior Publication Data

US 2020/0081557 A1 Mar. 12, 2020

Related U.S. Application Data

(60) Provisional application No. 62/727,817, filed on Sep. 6, 2018.

(51) Int. Cl.
| | |
|---|---|
| *G06F 3/01* | (2006.01) |
| *G06F 3/0362* | (2013.01) |
| *G06F 3/039* | (2013.01) |
| *G06F 3/038* | (2013.01) |
| *G06F 3/023* | (2006.01) |
| *B60K 37/06* | (2006.01) |
| *G06F 3/041* | (2006.01) |
| *H01H 19/00* | (2006.01) |

(52) U.S. Cl.
CPC .......... *G06F 3/0362* (2013.01); *G06F 3/0393* (2019.05); *G06F 3/041* (2013.01); *H01H 19/001* (2013.01)

(58) Field of Classification Search
CPC .................. G06F 3/0362–041; H01H 19/001
See application file for complete search history.

(56) References Cited

U.S. PATENT DOCUMENTS

| | | | | |
|---|---|---|---|---|
| 5,936,613 | A | * | 8/1999 | Jaeger .................. G06F 3/0238 345/172 |
| 2018/0074639 | A1 | * | 3/2018 | Powell .................. G06F 3/039 |
| 2018/0373351 | A1 | * | 12/2018 | Sawada ................ G06F 3/0383 |
| 2019/0278386 | A1 | * | 9/2019 | Masthoff .............. B60K 37/06 |
| 2019/0310718 | A1 | * | 10/2019 | Eraslan ................ G06F 3/039 |
| 2019/0391672 | A1 | * | 12/2019 | Fischer ................ G06F 3/0362 |
| 2020/0004377 | A1 | * | 1/2020 | Files .................... G06F 3/016 |

FOREIGN PATENT DOCUMENTS

JP 2014-203348 A 10/2014

* cited by examiner

*Primary Examiner* — Lin Li
(74) *Attorney, Agent, or Firm* — ScienBiziP, P.C.

(57) ABSTRACT

An input detecting device includes an input section where position input is performed, a position detecting section included in the input section and detecting an input position regarding at least the position input, a rotary member mounted on the input section so as to be rotatable and including an operation surface on an outer peripheral surface thereof with which a rotating operation is performed, a rotation detection section that is rotatable together with the rotary member with respect to the input section and a position of which is detected by the position detecting section, and an extended section extending laterally from the operation surface so as to be disposed between the operation surface and the input section.

14 Claims, 15 Drawing Sheets

INPUT DETECTING DEVICE

CROSS REFERENCE TO RELATED APPLICATION

This application claims priority from U.S. Provisional Patent Application No. 62/727,817 filed on Sep. 6, 2018. The entire contents of the priority application are incorporated herein by reference.

TECHNICAL FIELD

The technology described herein relates to an input detecting device.

BACKGROUND ART

One example of an input device including a touch panel has been known and such an input device is described in Japanese Unexamined Patent Application Publication No. 2014-203348. The input device is an input device for in-vehicle equipment and the input device includes dials that are to be used for inputting assigned functions by rotating operation, a plurality of touch switches that are disposed adjacent to the dials and to be used for inputting the assigned functions by touch operation, and a control unit that controls the in-vehicle equipment on the basis of the inputs to the dials and the touch switches. The control unit disables the input through the touch switches when an operator rotates the dials.

According to the input device, the input through the touch switches is disabled when an operator rotates the dials. This limits the input operation. Further, this requires information processing for disabling the input through the touch switches and such information processing increases loads.

SUMMARY

The technology described herein was made in view of the above circumstances. An object is to easily reduce occurrence of erroneous detection.

An input detecting device according to the technology described herein includes an input section where position input is performed, a position detecting section included in the input section and detecting an input position regarding at least the position input, a rotary member mounted on the input section so as to be rotatable and including an operation surface on an outer peripheral surface thereof with which a rotating operation is performed, a rotation detection section that is rotatable together with the rotary member with respect to the input section and a position of which is detected by the position detecting section, and an extended section extending laterally from the operation surface so as to be disposed between the operation surface and the input section.

According to the technology described herein, occurrence of erroneous detection is easily reduced.

DETAILED DESCRIPTION

First Embodiment

Figure 1:
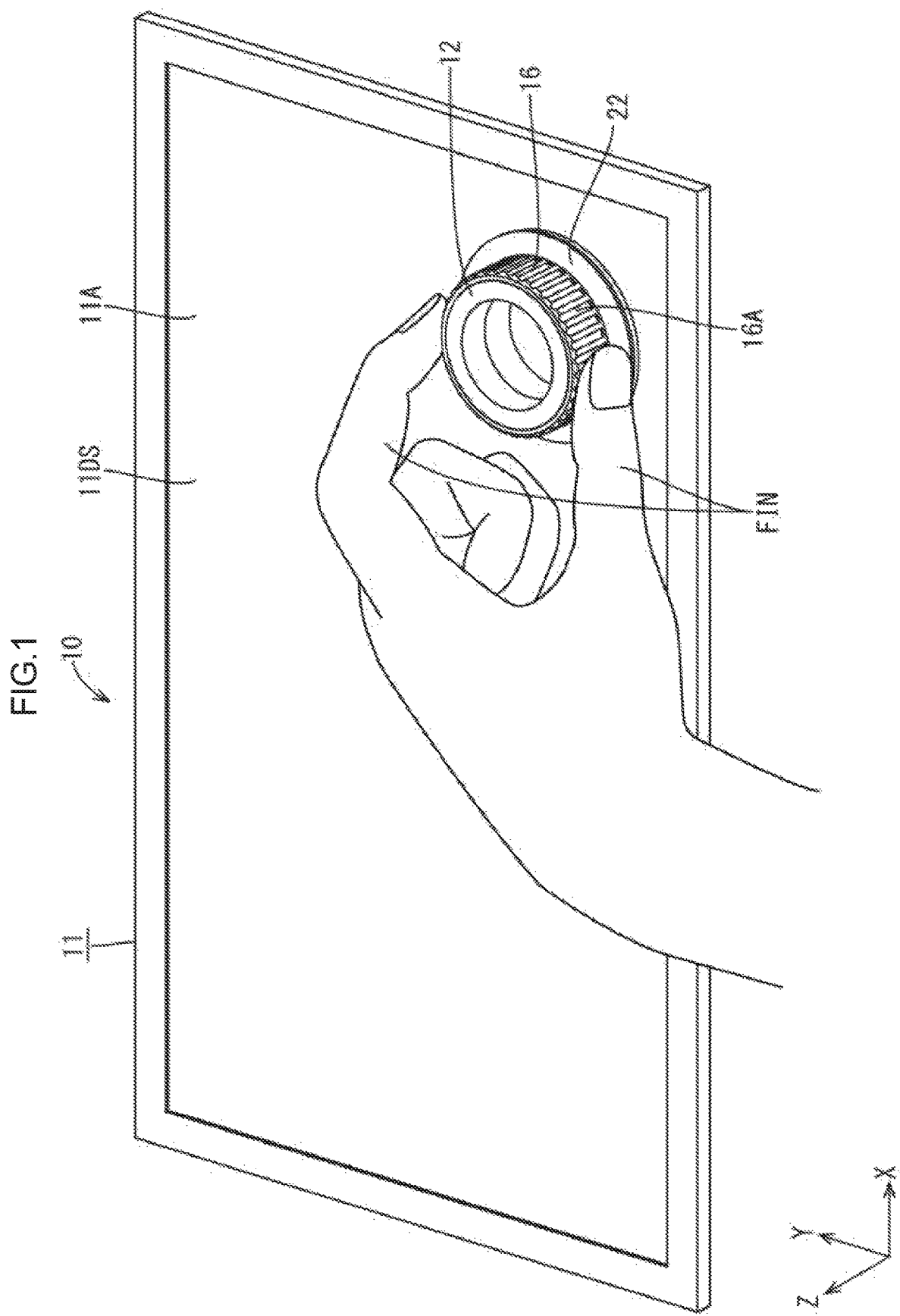
FIG. 1 is a perspective view of an input detecting device according to a first embodiment.

A first embodiment will be described with reference to FIGS. 1 to 9. In the embodiment section, an input detecting device 10 will be described. X-axis, Y-axis and Z-axis may be present in the drawings and each of the axial directions represents a direction represented in each drawing. A vertical direction is defined with reference to FIGS. 4, 6, and 7 and an upper side and a lower side in the drawings correspond to a front side and a back side, respectively.

As illustrated in FIG. 1, the input detecting device 10 at least includes a liquid crystal display device (an input section) 11 that displays images through which a touch operation input (position input) is performed by a user, and a dial 12 that is mounted on the liquid crystal display device 11. The liquid crystal display device 11 has a touch panel function (position input function) of detecting a position (touch position) input by a user in addition to a display function of displaying images. In the present embodiment, the input detecting device 10 is used for a car navigation system that is mounted in a car; however, the input detecting device may be used in any other devices as appropriate.

As illustrated in FIG. 1, the liquid crystal display device 11 at least includes a liquid crystal panel (a display panel), a cover glass (a cover panel, a panel protection member) 11A that is disposed on the liquid crystal panel on a front side thereof, and a backlight unit that supplies light to the liquid crystal panel. The liquid crystal panel is a known one that displays images with using light from the backlight unit, and includes a pair of substrates and a liquid crystal layer that is sealed therebetween. One of the substrates of the liquid crystal panel on the front side is a CF substrate (a counter substrate), and on the CF substrate, a color filter, a light blocking section (a black matrix), and an alignment film are disposed. The color filter includes color portions of red (R), green (G), and blue (B) that are arrayed in a predetermined arrangement. The light blocking section divides the adjacent color portions. On an array substrate (a TFT substrate) that is disposed on the back side, switching components (such as TFTs), pixel electrodes that are connected to the switching components, and alignment film are disposed. The switching components are connected to source lines and gate lines that are perpendicular to each other.

As illustrated in FIG. 1, the cover glass 11A and the liquid crystal panel have a laterally elongated rectangular shape. A long-side direction of the cover glass 11A and the liquid crystal panel matches the X-axis direction in each drawing, a short-side direction of the cover glass 11A and the liquid crystal panel matches the Y-axis direction in each drawing, and a thickness direction (a normal direction of a display surface 11DS) of the cover glass 11A and the liquid crystal panel matches the Z-axis direction in each drawing. The cover glass 11A covers a substantially entire area of the liquid crystal panel from the front side to protect the liquid crystal panel. The cover glass 11A is formed in a plate shape and made of substantially transparent glass having good transmissivity, and is preferably made of tempered glass. Chemically tempered glass is preferable as the tempered glass used for the cover glass 11A; however, it is not limited thereto. The chemical tempered glass is obtained by performing a chemical tempering treatment on a surface of a plate-shaped glass substrate to provide a chemical tempered layer on the surface.

Figure 2:
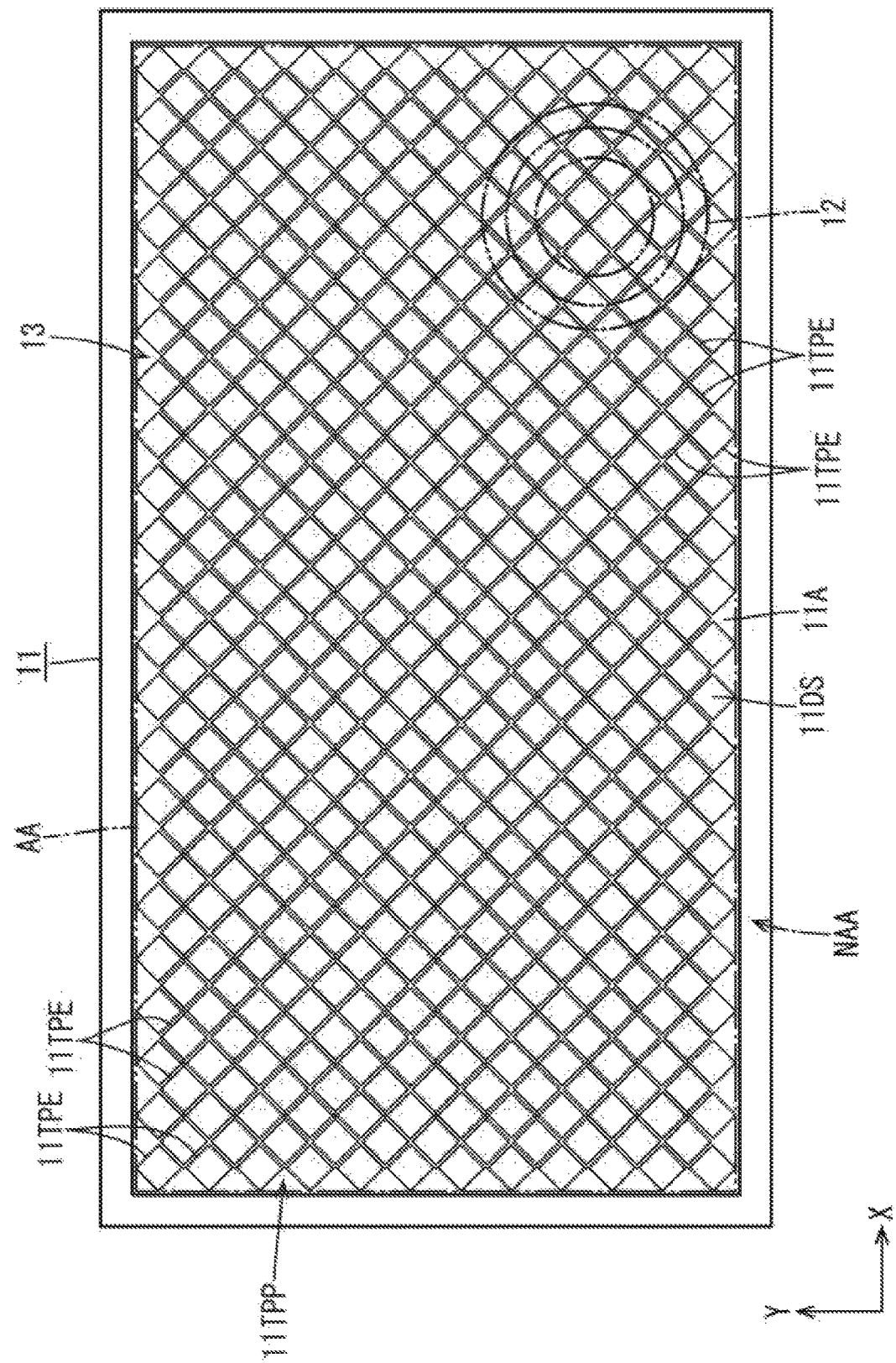
FIG. 2 is a plan view of the input detecting device.

As illustrated in FIG. 2, the liquid crystal display device 11 includes a display surface 11DS, and the surface 11DA is defined into a display area (an active area) AA where an image is displayed and a non-display area (a non-active area) NAA that is formed in a frame shape and surrounds the display area AA. In FIG. 2, an outline of the display area AA is illustrated with a chain line and an area outside the chain line is the non-display area NAA. The liquid crystal display device 11 includes a position detecting section 13 that detects an input position where a user touches. In FIG. 2, the dial 12 is illustrated with a two-dot chain line to clearly illustrate the position detecting section 13. The position detecting section 13 includes a projected capacitive touch panel pattern 11TP. The touch panel pattern 11TP is a built-in pattern that is mounted in one of the cover glass 11A and the liquid crystal panel. The built-in type touch panel pattern 11TP mounted in the cover glass 11A is referred to as an out-cell type touch panel pattern and the built-in type touch panel pattern 11TP mounted in the liquid crystal panel is referred to as an in-cell type. A detection type of the touch panel pattern 11TP is a self-capacitive type, for example. The touch panel pattern 11TP at least includes touch electrodes (position detecting electrodes) 11TPE that are arrayed in a matrix in the display area AA. Therefore, the display area AA substantially matches a touch area (a position detection area) where input positions can be detected, and the non-display area NAA substantially matches a non-touch area (a position non-detection area) where input position cannot be detected. If a user performs a touch operation with user's finger (a position inputter) FIN based on an image on the display area AA that is seen by the user, an electrostatic capacitance is induced between the finger FIN, which is a conductive member, and a touch electrode 11TPE (see FIG. 1). The electrostatic capacitance detected at the touch electrode 11TPE near the finger FIN is changed according to the approach of the finger FIN and the electrostatic capacitance detected at the touch electrode 11TPE near the finger FIN differs from that detected at the touch electrode 11TPE far away from the finger FIN. According to such difference, the input position is detected. The touch panel pattern 11TP is connected to a control board via a flexible circuit board and a signal that is output from the touch panel pattern 11TP is detected with a touch detection circuit that is included in the control board.

Next, the dial 12 will be described. As illustrated in FIG. 1, the dial 12 projects toward a front side from the display surface 11DS of the liquid crystal display device 11 such that a user holds the dial 12 with the user's fingers FIN and rotates it. The dial 12 includes a rotation detection section 14 with which a position thereof can be detected by the position detecting section 13 (refer FIG. 7). When the dial 12 is rotated, a position of the rotation detection section 14 is detected by the position detecting section 13 such that information regarding a rotation state such as the number of rotation, a rotational angle, and rotation speed of the dial 12 can be obtained. Accordingly, an image according to the rotation state of the dial 12 is displayed. Hereinafter, a specific configuration of the dial 12 will be described.

Figure 3:
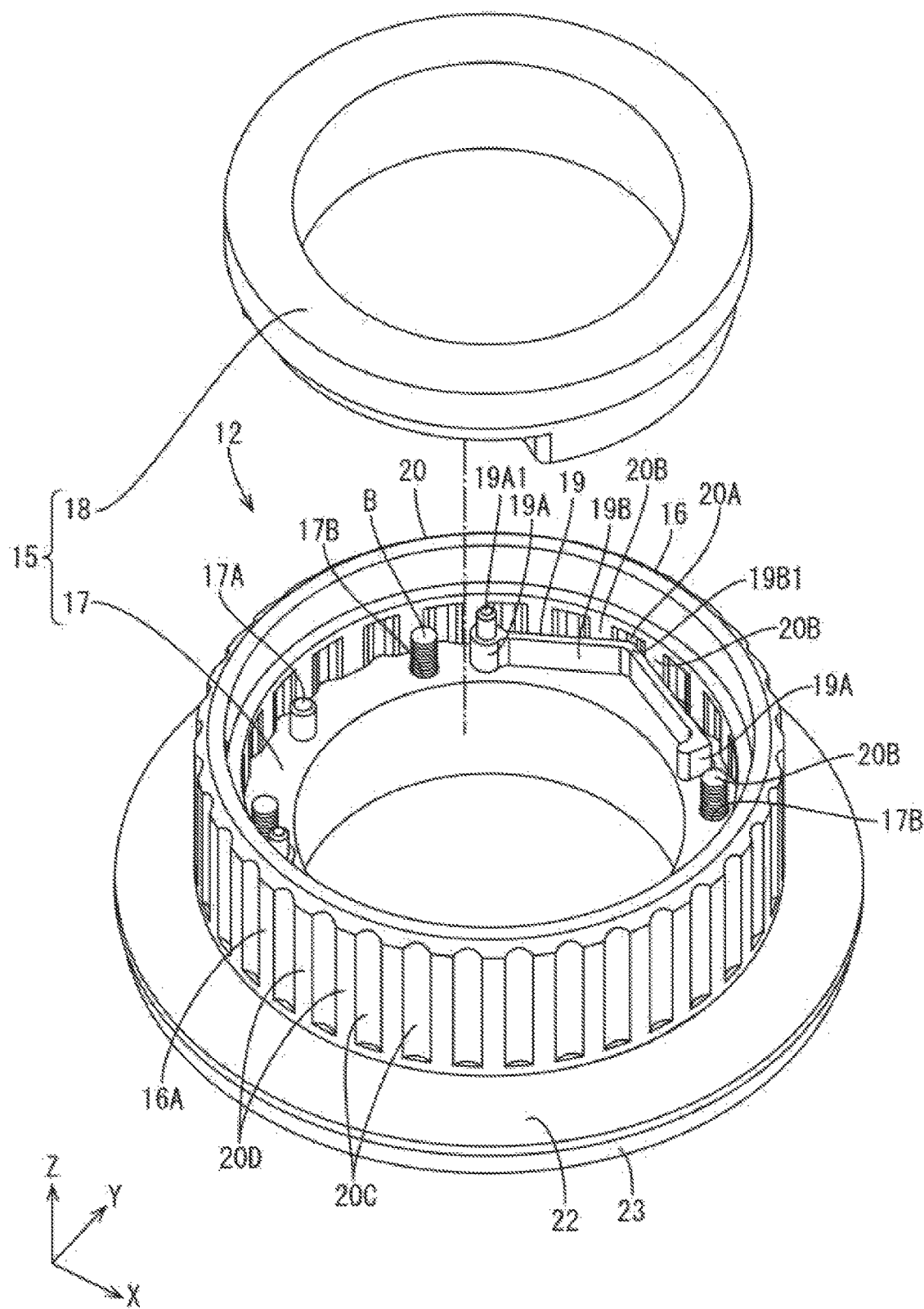
FIG. 3 is a perspective view illustrating a dial from which a second fixed member is detached.
Figure 4:
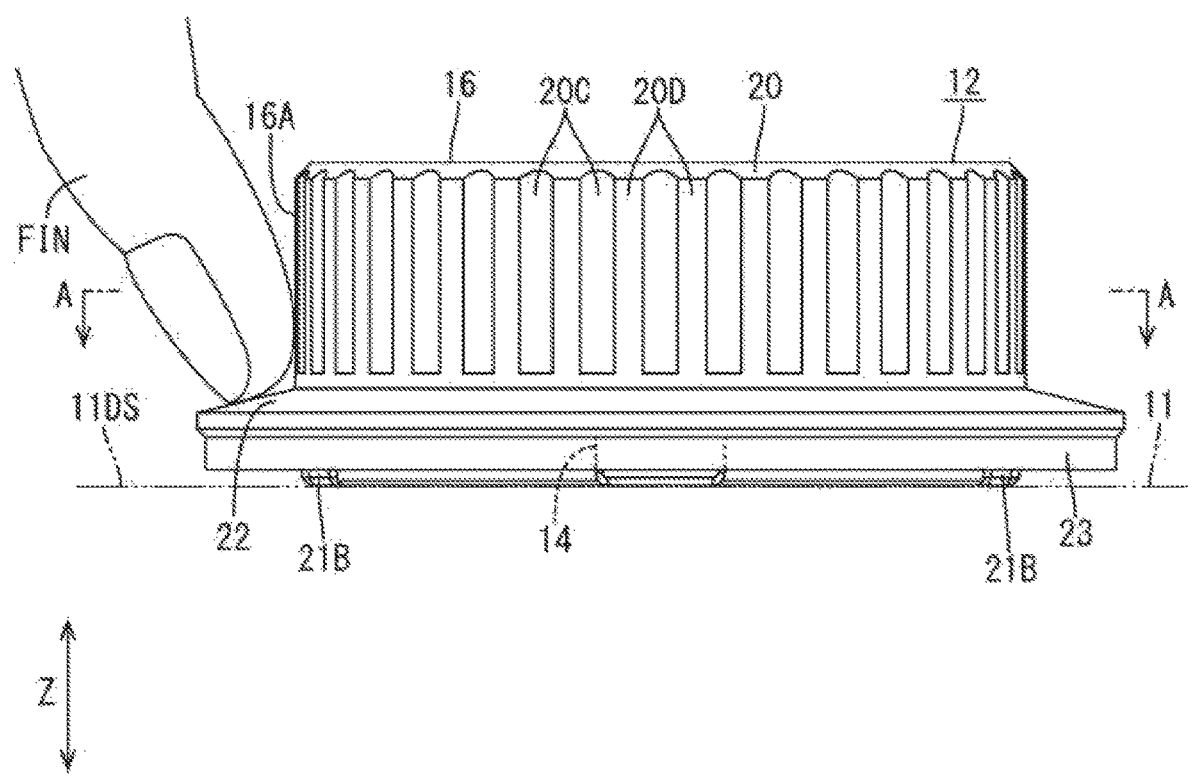
FIG. 4 is a side view of the dial.

As illustrated in FIGS. 3 and 4, the dial 12 at least includes a fixed member 15 that is fixed to the liquid crystal display device 11, and a rotary member 16 that is rotatable and mounted in the fixed member 15. The rotary member 16 includes the rotation detection section 14 and the rotary member 16 and the rotation detection section 14 are rotatable with respect to the fixed member 15.

Figure 5:
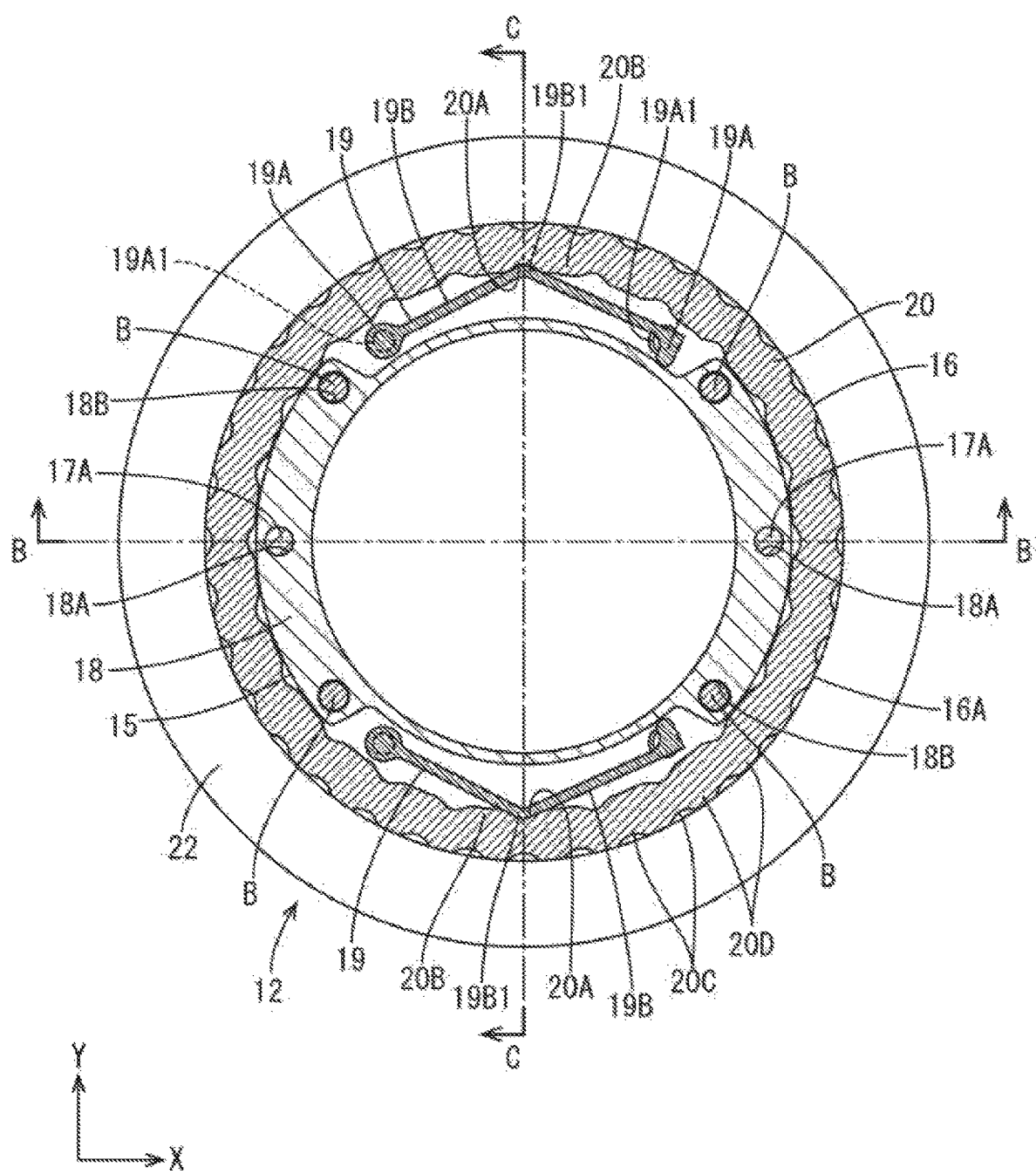
FIG. 5 is a cross-sectional view taken along line A-A in FIG. 4.
Figure 6:
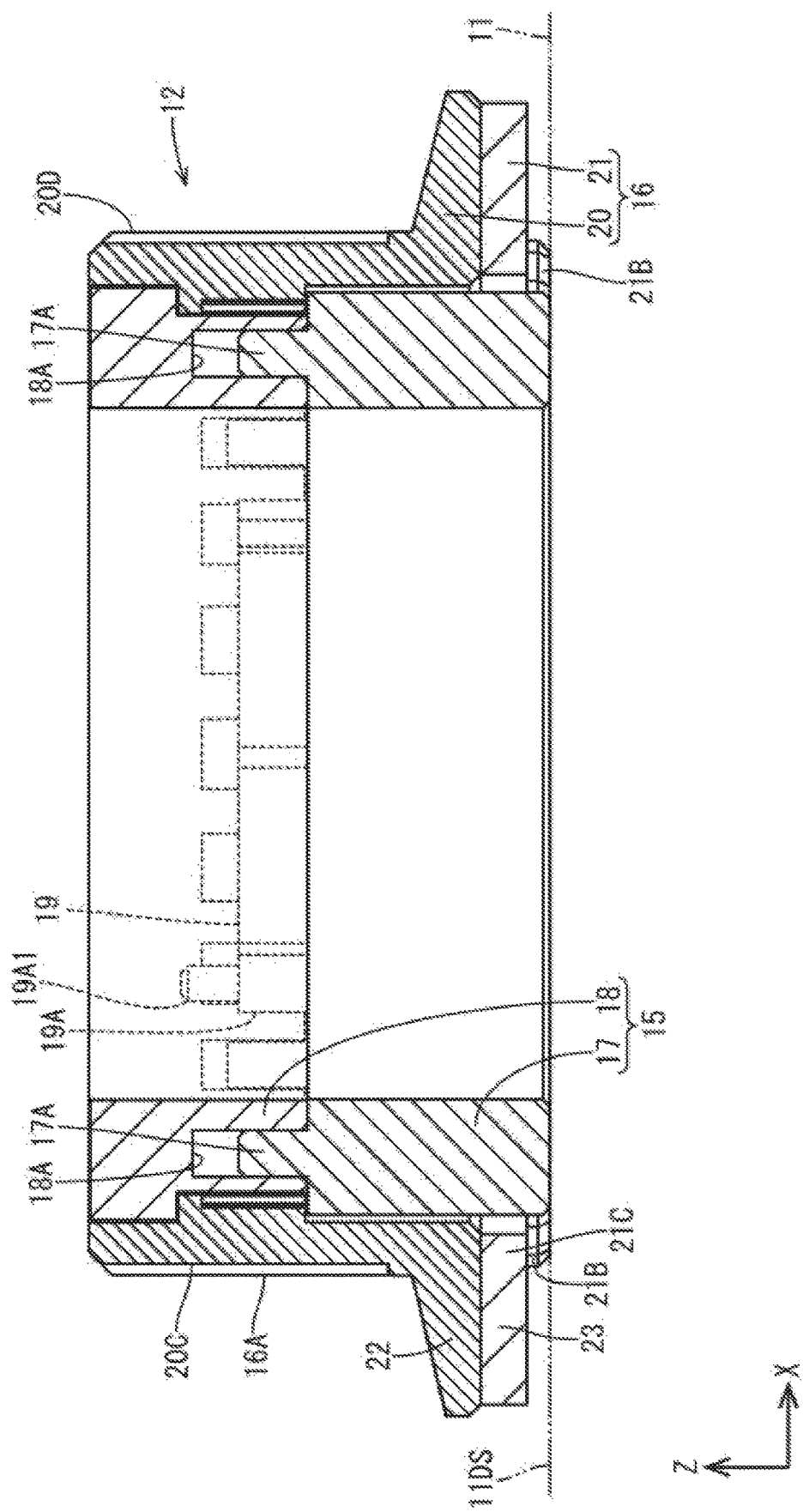
FIG. 6 is a cross-sectional view taken along line B-B in FIG. 5.

As illustrated in FIGS. 3 and 6, the fixed member 15 has substantially a tubular overall shape (substantially ring shape). The fixed member 15 includes a first fixed member 17 and a second fixed member 18. The first fixed member 17 is directly fixed to the liquid crystal display device 11. The second fixed member 18 is disposed on a front side of the first fixed member 17 with respect to the Z-axis direction and mounted in the first fixed member 17. The first fixed member 17 and the second fixed member 18 have no conductivity and are made of synthetic resin, for example. The first fixed member 17 and the second fixed member 18 are disposed concentrically and inner peripheral surfaces thereof are substantially on a same plane surface and outer peripheral surfaces thereof are substantially on a same plane surface. A back side edge surface of the first fixed member 17 is bonded to the display surface 11DS of the liquid crystal display device 11 with adhesive. The first fixed member 17 includes a positioning projection 17A on a front side edge surface and the positioning projection 17A projects toward the front side in the Z-axis direction. The second fixed member 18 is mounted in the first fixed member 17 such that a back side edge surface thereof faces the front side edge surface of the first fixed member 17. The second fixed member 18 includes a positioning recess 18A on the back side edge surface and the positioning recess 18A receives the positioning projection 17A therein. The first fixed member 17 and the second fixed member 18 are fixed to each other with the positioning projection 17A and the positioning recess 18A. Two positioning projections 17A and two positioning recesses 18A are disposed at angular intervals of about 180 degrees with respect to the rotation direction of the dial 12, respectively. As illustrated in FIGS. 3 and 5, the first fixed member 17 and the second fixed member 18 include screw insertion holes 17B, 18B, respectively. Screw members (a fixing member) B are inserted in the screw insertion holes 17B, 18B to fix the first fixed member 17 and the second fixed member 18 in a mount state (refer FIG. 13 regarding the screw insertion hole 17B). Four screw insertion holes 17B, four screw insertion holes 18B, and four screw members B are disposed at a same angular interval away from the positioning projections 17A and the positioning recesses 18A with respect to the rotation direction of the dial 12.

As illustrated in FIGS. 3 and 5, the fixed member 15 having the above configuration includes latch members 19. The latch members 19 are fixed to the fixed member 15 and create latch sound such as ticking sound according to the rotation of the rotary member 16. Specifically, the latch members 19 are disposed between the first fixed member 17 and the second fixed member 18 with respect to the Z-axis direction. The latch member 19 includes a pair of support portions 19A that are fixed to the fixed member 15 and a both end support arm portion 19B that connects the support portions 19A. The pair of support portions 19A includes latch holding projections 19A1, respectively, and the latch holding projections 19A1 project in the Z-axis direction. One of the pair of support portions 19A includes the latch holding projections 19A1 that project from a front side and a back side thereof, respectively. Another one of the pair of support portions 19A includes one latch holding projection 19A1 that projects only from the back side thereof. The first fixed member 17 and the second fixed member 18 that sandwich the latch members 19 therebetween include latch holding recesses on opposing surfaces thereof that face the latch members 19. The latch holding projections 19A1 are received in the latch holding recesses. The latch holding projections 19A1 are fit in the latch holding recesses such that the latch members 19 are held by the fixed member 15. The arm portion 19B has a substantially plan view V-shape and is elastically deformable with the pair of support sections 19A serving as support points. The arm portion 19B is elastically deformed in the Y-axis direction, that is, a deforming direction substantially matches a radial direction of the rotary member 16. The arm portion 19B includes a contact portion 19B1 at a middle portion thereof that projects to an outermost position in the radial direction. The contact portion 19B1 is to be contacted with an inner peripheral surface of the rotary member 16. The rotary member 16 includes first recesses 20A and first projections 20B on the inner peripheral surface thereof alternately in the rotation direction (a circumferential direction) of the rotary member 16. According to such a configuration, when the rotary member 16 rotates, the arm portion 19B slides on the first recesses 20A and the first projections 20B that are disposed repeatedly in the rotation direction and the arm portion 19B is elastically deformed and elastically recovers its original shape repeatedly with the pair of support portions 19A serving as the support points. According to the deformation of the arm portion 19B, latch sound is created. Intervals of the latch sound tend to be shorter as the rotation speed is increased.

As illustrated in FIGS. 3 and 5, the rotary member 16 is formed in a substantially tubular (substantially annular) shape that is slightly larger than the shape of the fixed member 15 and the rotary member 16 is fit to the fixed member 15 so as to surround the entire periphery of the fixed member 15. The rotary member 16 includes a first rotary member 20 and a second rotary member 21. The first rotary member 20 has an operation surface 16A with which a user can operate the rotary member. The second rotary member 21 is disposed on a back side (a liquid crystal display device 11 side) of the first rotary member 20 in the Z-axis direction and fixed to the first rotary member 20. The first rotary member 20 has conductivity and is made of metal (conductive material), for example. The first rotary member 20 is formed in a substantially tubular shape and an outer peripheral surface thereof is the operation surface 16A with which a user performs a rotating operation. Therefore, when a user holds the first rotary member 20 while touching the operation surface 16A with the user's fingers FIN, the first rotary member 20 has a potential same as that of the fingers FIN. The first rotary member 20 includes the first recesses (recesses) 20A and the first projections (projections) 20B on the inner peripheral surface thereof repeatedly in the rotation direction. The first recess 20A allows the contact portion 19B1 of the arm portion 19B to be fit therein. The first projections 20B project further toward a center of the rotary member 16 in the radial direction than the first recesses 20A. Therefore, if the rotary member 16 is further rotated from the state that the contact portion 19B1 is fit in the first recess 20A, the contact portion 19B1 moves on the first projection 20B and the arm portion 19B is elastically deformed. Thereafter, the contact portion 19B1 slides over the first projection 20B and is fit in the adjacent first recess 20A and accordingly, the arm portion 19B elastically restores its original shape. Further, the first rotary member 20 includes second recesses 20C and second projections 20D on the operation surface 16A so as to be arranged in the rotation direction repeatedly. The second recesses 20C and the second projections 20D function as a slip stopper for fingers FIN of the user who holds the operation surface 16A.

Figure 7:
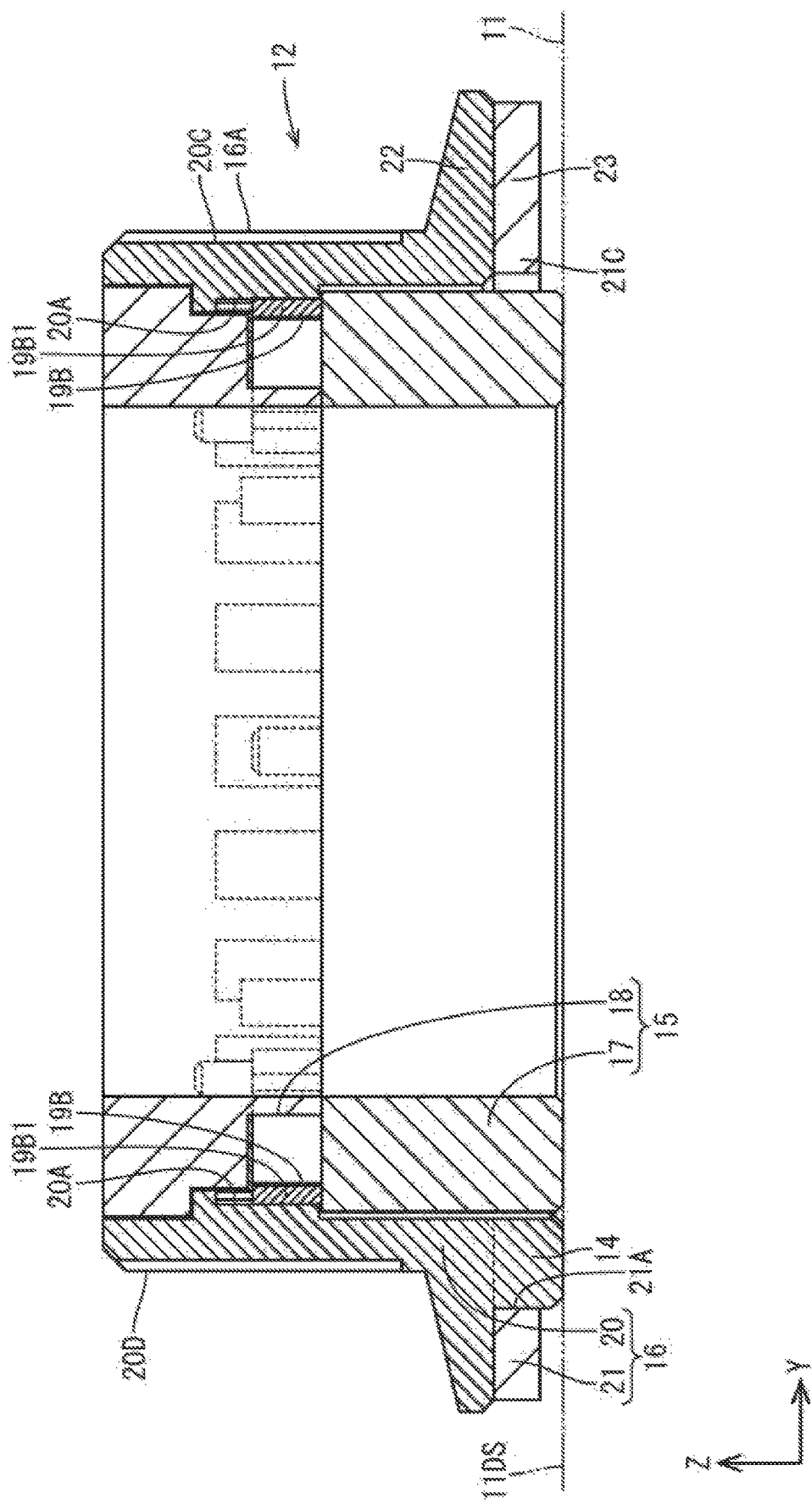
FIG. 7 is a cross-sectional view taken along line C-C in FIG. 5.
Figure 8:
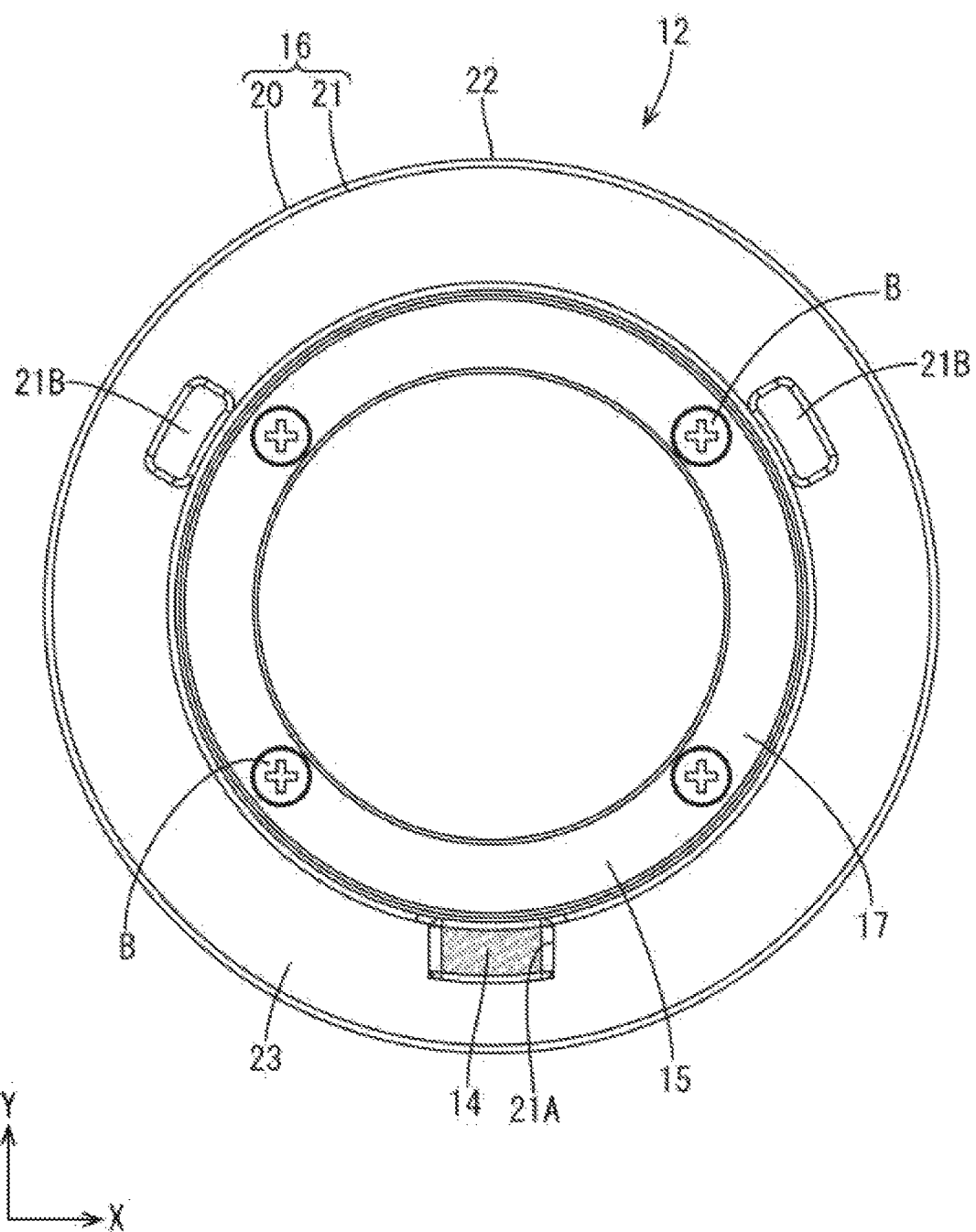
FIG. 8 is a bottom view of the dial.

As illustrated in FIG. 7, the first rotary member 20 integrally includes the rotation detection section 14. Namely, the rotation detection section 14 has conductivity and is electrically conductive to the first rotary member 20. The rotation detection section 14 projects from an edge side portion of the back surface of the first rotary member 20 toward the back side in the Z-axis direction. The second rotary member 21 has no conductivity and is made of synthetic resin, for example, and has a substantially disk-like shape that is along the first rotary member 20. The second rotary member 21 is bonded to the first rotary member 20 with adhesive. The second rotary member 21 includes a hole 21A that opens toward the front side (the first rotary member 20 side) and the back side (the liquid crystal display 11 side) in the Z-axis direction. The rotation detection section 14 of the first rotary member 20 is inserted in the hole 21A. The rotary detection section 14 that is disposed in the hole 21A is arranged closest to the liquid crystal display device 11 with respect to the Z-axis direction among sections of the first rotary member 20. According to such arrangement, the position within a plane surface of the display surface 11DS with respect to the X-axis direction and the Y-axis direction can be detected by the position detecting section 13. Furthermore, the rotary detection section 14 projects further toward the back side in the Z-axis direction than the second rotary member 21. As illustrated in FIGS. 6 and 8, the second rotary member 21 includes projections 21B that project toward the back side in the Z-axis direction. In FIG. 8, the rotary detection section 14 is illustrated with shading. Projected distal end surfaces of the projections 21B are substantially on a same plane surface as a projected distal end surface of the rotary detection section 14. Therefore, the projections 21B and the rotary detection section 14 are disposed to fill a space between the back surface of the second rotary member 21 and the display surface 11DS and support the rotary member 16. If the projections 21B are not included, the rotary member 16 is supported only by the rotation detection section 14 and may be slanted. In this respect, the rotary member 16 is supported stably and is less likely to be slanted due to the projections 21B. Furthermore, two projections 21B are disposed such that each of the projections 21B is spaced from the rotation detection section 14 in the rotation direction. The two projections 21B and the rotation detection section 14 are spaced from each other at an angular interval of about 120 degrees in the rotation direction and are arranged at equal intervals.

As illustrated in FIGS. 4, 6, and 7, the dial 12 according to the present embodiment includes an extended section 22 that extends laterally from the operation surface 16A so as to be disposed between the operation surface 16A and the liquid crystal display device 11 with respect to the Z-axis direction. Specifically, the extended section 22 is integrally included in the first rotary member 20 that includes the operation surface 16A. The extended section 22 extends over an entire periphery of the operation surface 16A and is formed in an endless loop. The extended section 22 is disposed between the liquid crystal display device 11 and the fingers FIN of a user who holds the rotary member 16 with the operation surface 16A, and therefore the extended section 22 can receive the fingers FIN from the back side in the Z-axis direction. Accordingly, the position relation of the fingers FIN and the liquid crystal display device 11 can be stably maintained. Therefore, position input to the liquid crystal display device 11 is less likely to be performed by mistake by the fingers FIN that holds the operation surface 16A.

As illustrated in FIGS. 6 and 7, the second rotary member 21 integrally includes a second extended section 23 that is disposed between the extended section 22 and the liquid crystal display device 11 with respect to the Z-axis direction. Namely, the second rotary member 21 includes a body section 21C and the second extended section 23. The body section 21C is disposed on the back side with respect to the first rotary member 20 in the Z-axis direction and between the first rotary member 20 and the liquid crystal display device 11. The second extended section 23 extends laterally from the body section 21C. The second extended section 23 is formed in an endless loop along the extended section 22. The second extended section 23 is disposed to fill a space between the extended section 22 and the liquid display device 11 so as to support the extended section 22 stably from the back side with respect to the Z-axis direction. Accordingly, the extended section 22 surely exerts a function of reducing occurrence of erroneous detection of an input position. The second extended section 23 has an outer peripheral surface that is located on an inner side than the outer peripheral surface of the extended section 22. According to such a configuration, the second extended section 23 is covered with the extended section 22 such that the second extended section 23 is less likely to be seen by a user, and an outer appearance of the input detecting device 10 is improved.

Figure 9:
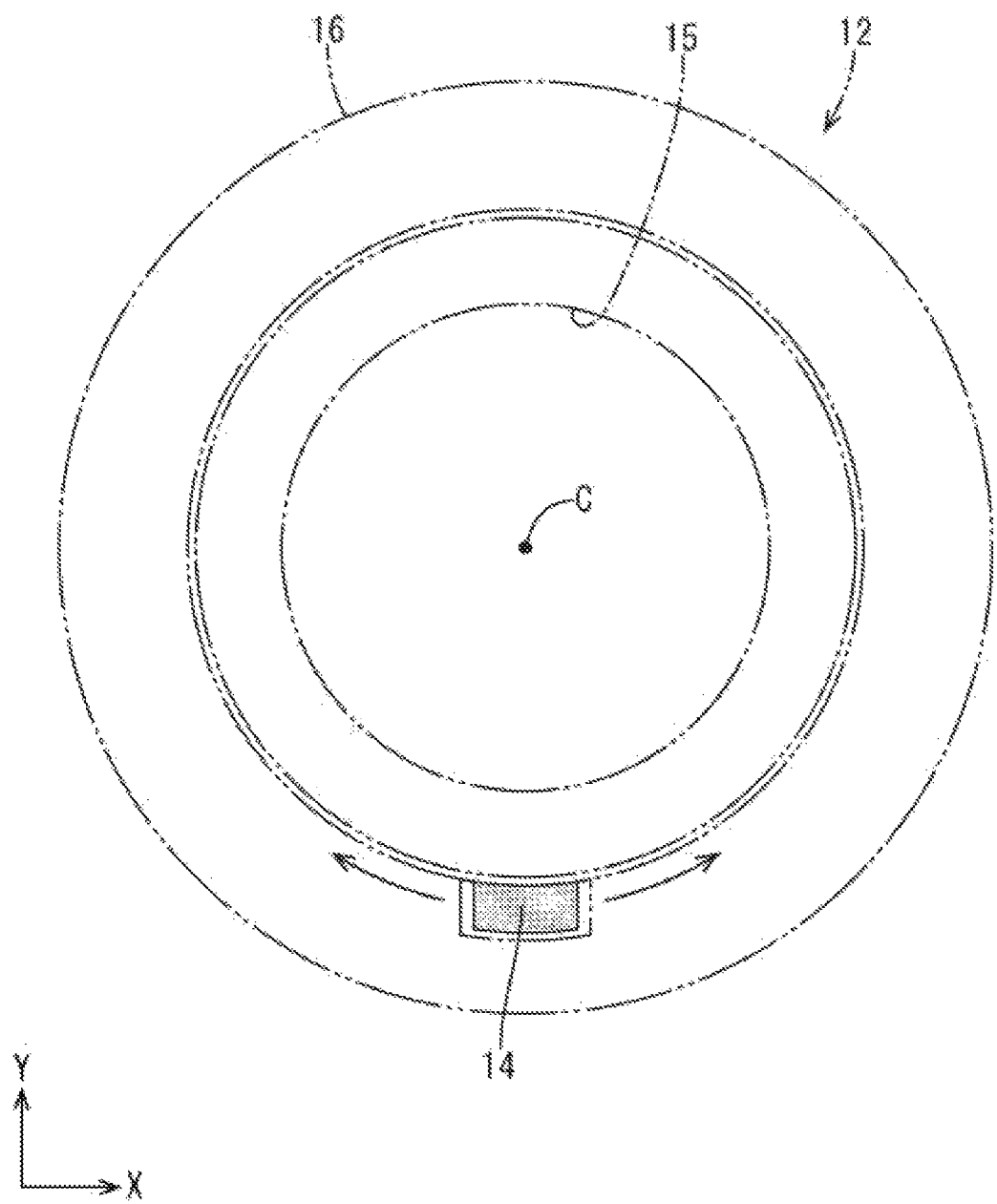
FIG. 9 is a view illustrating movement of a rotation detection section according to rotation of the dial.

The present embodiment has the above-described configuration, and operations thereof will be described next. As illustrated in FIGS. 1 and 4, if a user holds the rotary member 16 of the dial 12 on the operation surface 16A with the fingers FIN and rotates the rotary member 16, the rotary member 16 is rotated with respect to the fixed member 15 and the liquid crystal display device 11. If the rotary member 16 is rotated, the rotation detection section 14 that is integrally included in the first rotary member 20 is also rotated. As illustrated in FIG. 9, the rotary detection section 14 moves so as to be rotated around a center C of the rotary member 16. The rotation detection section 14 is illustrated with shading in FIG. 9. Since the first rotary member 20 that includes the rotation detection section 14 has conductivity, the rotation detection section 14 has a same potential as that of the fingers FIN while a user is holding the rotation surface 16A with the fingers FIN and performing a rotating operation. Therefore, a position of the rotation detection section 14 that is rotated together with the rotary member 16 is properly detected by the position detecting section 13 that includes the electrostatic capacitive type touch panel pattern 11TP. Information relating the rotation state such as the number of rotation, the rotation angle, and the rotation speed of the dial 12 can be obtained by detecting the position of the rotation detection section 14 by the position detecting section 13. An image according to the rotation state of the dial 12 is displayed based on the information. As illustrated in FIG. 5, when the dial 12 is rotated, the arm portion 19B of the latch member 19 slides along the first recesses 20A and the first projections 20B that are repeatedly disposed in the rotation direction and the arm portion 19B is elastically deformed and elastically restores its shape repeatedly while the pair of support portions 19A serving as support points. According to the movement of the arm portion 19B, latch sound such as ticking sound and vibration are created. The latch sound and vibration are created such that a user can intuitively know the rotation state of the dial 12 by the sense of hearing and the sense of touching.

As described above, the input detecting device 10 according to the present embodiment includes the liquid crystal display device (input section) 11 on which position input is performed, the position detecting section 13 that is included in the liquid crystal device 11 and detects a input position related to at least the position input, the rotary member 16, the rotary detection section 14, and the extended section 22. The rotary member 16 is mounted in the liquid crystal display device to be rotatable and has an outer peripheral surface that is the operation surface 16A with which rotation operation is performed. The rotation detection section 14 is rotatable together with the rotation member 16 with respect to the liquid crystal display device 11 and a position of the rotation detection section 14 is detected by the position detecting section 13. The extended section 22 extends laterally from the operation surface 16A and is disposed between the operation surface 16A and the liquid crystal display device 11.

According to such a configuration, if the position input is performed on the liquid crystal display device by a user, an input position is detected by the position detecting section 13. On the other hand, if a user rotates the rotary member 16 with the operation surface 16A, the rotary member 16 is rotated with respect to the liquid crystal display device 11. At this time, the rotation detection section 14 is rotated together with the rotary member 16 with respect to the liquid crystal display device 11 and the position of the rotation detection section 14 is detected by the position detecting section 13. A user holds the operation surface 16A of the rotary member 16 with the user's fingers FIN to perform the rotating operation of the rotary member 16. If a position input is made on the liquid crystal display device 11 by the fingers FIN that hold the operation surface 16A by mistake, the input position that is not intended by a user may be erroneously detected by the position detecting section 13. In this respect, as described above, the extended section 22 extends laterally from the operation surface 16A and is disposed between the operation surface 16A and the liquid crystal display device 11. According to such a configuration, the fingers FIN of the user who holds the operation surface 16A of the rotary member 16 are received by the extended section 22, and the position relation between the fingers FIN and the liquid crystal display device 11 can be maintained stably. Accordingly, the position input is less likely to be made by the fingers FIN that perform a rotating operation with the operation surface 16A and erroneous detection of the input position is less likely to be caused. As described above, the extended section 22, which is a component, reduces occurrence of erroneous detection of the input position. Therefore, compared to a configuration in which input by a touch switch is invalidated by software, restriction is less likely to be caused in a position input performance and information processing is not necessary, and electric load is less likely to be increased.

The rotary member 16 includes the first rotary member 20, which has the operation surface 16A, and the second rotary member 21, which is disposed on the liquid crystal display device 11 side with respect to the first rotary member 20 and fixed to the first rotary member 20. The extended section 22 is integrally included in the first rotary member 21. Accordingly, the position relation of the first rotary member 20 and the liquid crystal display panel 11 is maintained stably by the second rotary member 21 that is disposed on the liquid crystal display device 11 side with respect to the first rotary member 20 having the operation surface 16A and fixed to the first rotary member 20. Since the extended section 22 is integrally included in the first rotary member 20 that has the operation surface 16A, the outer appearance is improved.

The second rotary member 21 integrally includes the second extended section 23 that is disposed between the extended section 22 and the liquid crystal display device 11. Accordingly, the extended section 22 is stably supported by the second extended section 23 from the liquid crystal display device 11 side. Accordingly, the extended section 22 can surly exert a function of reducing occurrence of erroneous detection of the input position.

The extended section 22 has a shape of an endless loop so as to extend over an entire periphery of the operation surface 16A. According to such a configuration, erroneous position input made by the fingers FIN that hold the operation surface 16A is less likely to be made on the liquid crystal display device 11 compared to a configuration including the extended section 22 on a portion of the operation surface 16A in the circumferential direction. Accordingly, the input position that is not intended by a user is less likely to be erroneously detected by the position detecting section 13.

The fixed member 15 is fixed to the liquid crystal display device 11 and the rotary member 16 is mounted in the fixed member 15 so as to be rotatable. Accordingly, the rotary member 16 is held in a rotatable state by the fixed member 15 that is fixed to the liquid crystal display device 11. If a sliding member that slides on the liquid crystal display device 11 includes the rotary member 16, the sliding member may obstruct the position input on the liquid crystal display device 11 that is made by a user. Compared to such a configuration, the position input on the liquid crystal display device 11 can be made smoothly in the present embodiment. Further, a sliding mechanism for sliding the sliding member is not necessary.

The latch member 19 includes the support portions 19A, which are fixed to the fixed member 15, and the arm portion 19B, which is elastically deformable while the support portions 19A serving as the support points. The rotary member 16 includes the first recesses 20A and the first projections 20B on the inner peripheral surface thereof and the first recesses 20A and the first projections 20B are arranged repeatedly in the rotation direction of the rotary member 16. According to such a configuration, the support portions 19A of the latch member 19 are fixed to the fixed member 15 and the arm portion 19B is in contact with the inner peripheral surface of the rotary member 16. If the rotary member 16 is rotated with respect to the fixed member 15, the first recesses 20A and the first projections 20B that are formed on the inner peripheral surface of the rotary member 16 are moved relatively to the latch member 19 in the rotation direction. Then, the arm portion 19B of the latch member 19 slides on the first recesses 20A and the first projections 20B that are disposed repeatedly in the rotation direction and the arm portion 19B is elastically deformed and elastically recovers its original shape repeatedly while the pair of support portions 19A serving as the support points. According to the deformation of the arm portion 19B, sound is created. Therefore, a user can know the rotation state of the rotary member from the sound.

The fixed member 15 includes the first fixed member 17 and the second fixed member 18. The first fixed member 17 is disposed on the liquid crystal display device 11 side with respect to the latch members 19. The second fixed member 18 and the first fixed member 17 hold the latch members 19 therebetween. According to such a configuration, the latch members 19 are held and kept between the first fixed member 17 and the second fixed member 18. The latch members 19 are easily mounted on and removed from the fixed member 15.

The position detecting section 13 includes the electrostatic capacitive type touch panel pattern 11TP. The rotary member 16 includes the operation surface 16A and includes the first rotary member 20 that has conductivity. The rotation detection section 14 has conductivity and is electrically conductive to the first rotary member 20. According to such a configuration, the rotation detection section 14 that has conductivity is electrically conductive to the first rotary member 20 that has conductivity. Therefore, when a user performs a rotating operation on the operation surface 16A of the first rotary member 20, the rotation detection section 14 and the first rotary member 20 have a same potential as that of the user. Therefore, a position of the rotation detection section 14 that is rotated together with the rotary member 16 can be properly detected by the position detecting section 13 that includes the electrostatic capacitive type touch panel pattern 11TP.

The rotation detection section 14 is integrally included in the first rotary member 20. According to such a configuration, the rotation detection section 14 has good followability to the first rotary member 20 in the rotating operation compared to a configuration that includes the rotation detection section 14 separately from the first rotary member 20.

The rotary member 16 includes the second rotary member 21 that is disposed on the liquid crystal display device 11 side with respect to the first rotary member 20 and fixed to the first rotary member 20. The second rotary member 21 includes the hole 21A that opens toward the liquid crystal display device 11 and the first rotary member 20. The rotation detection section 14 projects from a portion of the first rotary member 20 toward the liquid crystal display device 11 and is arranged in the hole 21A. According to such a configuration, the position relation of the first rotary member 20 and the liquid crystal display device 11 can be stably maintained by the second rotary member 21 that is disposed on the liquid crystal display device 11 side with respect to the first rotary member 20 having the operation surface 16A and fixed to the first rotary member 20. The rotation detection section 14 projects from a portion of the first rotary member 20 toward the liquid crystal display device 11 and is arranged in the hole 21A that is formed in the second rotary member 21 and opens toward the liquid crystal display device 11 and the first rotary member 20. According to such a configuration, the position of the rotation detection section 14 can be properly detected by the position detecting section 13 that includes the electrostatic capacitive type touch panel pattern 11TP.

The rotation detection section 14 projects further toward the liquid crystal display device 11 than the second rotary member 21, and the second rotary member 21 includes the projections 21B that project toward the liquid crystal display device 11. According to such a configuration, the second rotary member 21 includes the projections 21B that project toward the liquid crystal display device 11. Therefore, even if the rotation detection section 14 projects further toward the liquid crystal display device 11 than the second rotary member 21, the rotary member 16 is supported stably with respect to the liquid crystal display device 11.

Second Embodiment

A second embodiment will be described with reference to FIG. 10 or FIG. 11. In the second embodiment, a structure of an extended section 122 is altered. Configurations, operations, and effects similar to those of the first embodiment will not be described.

Figure 10:
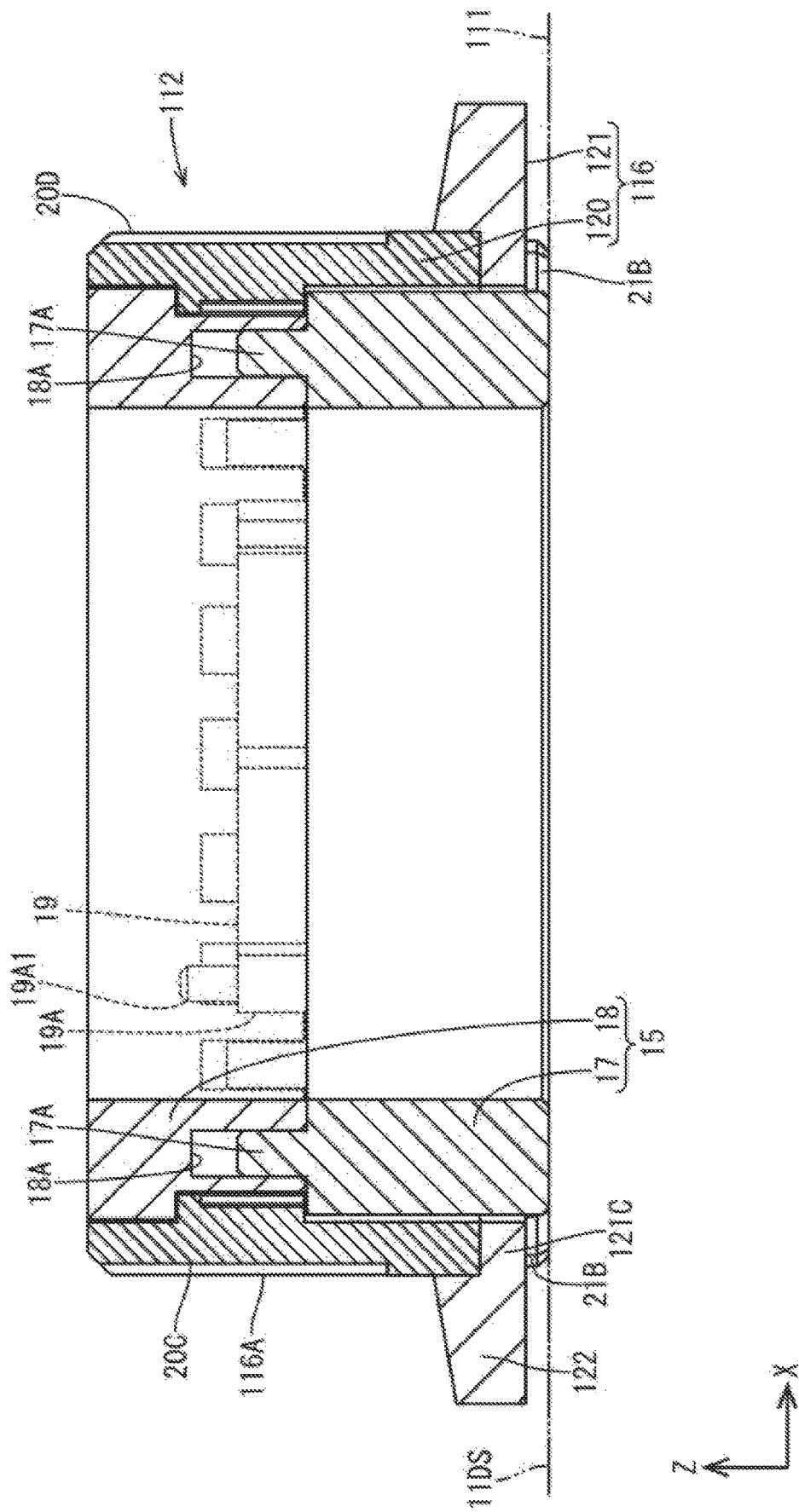
FIG. 10 is a cross-sectional view corresponding to FIG. 6 according to a second embodiment.
Figure 11:
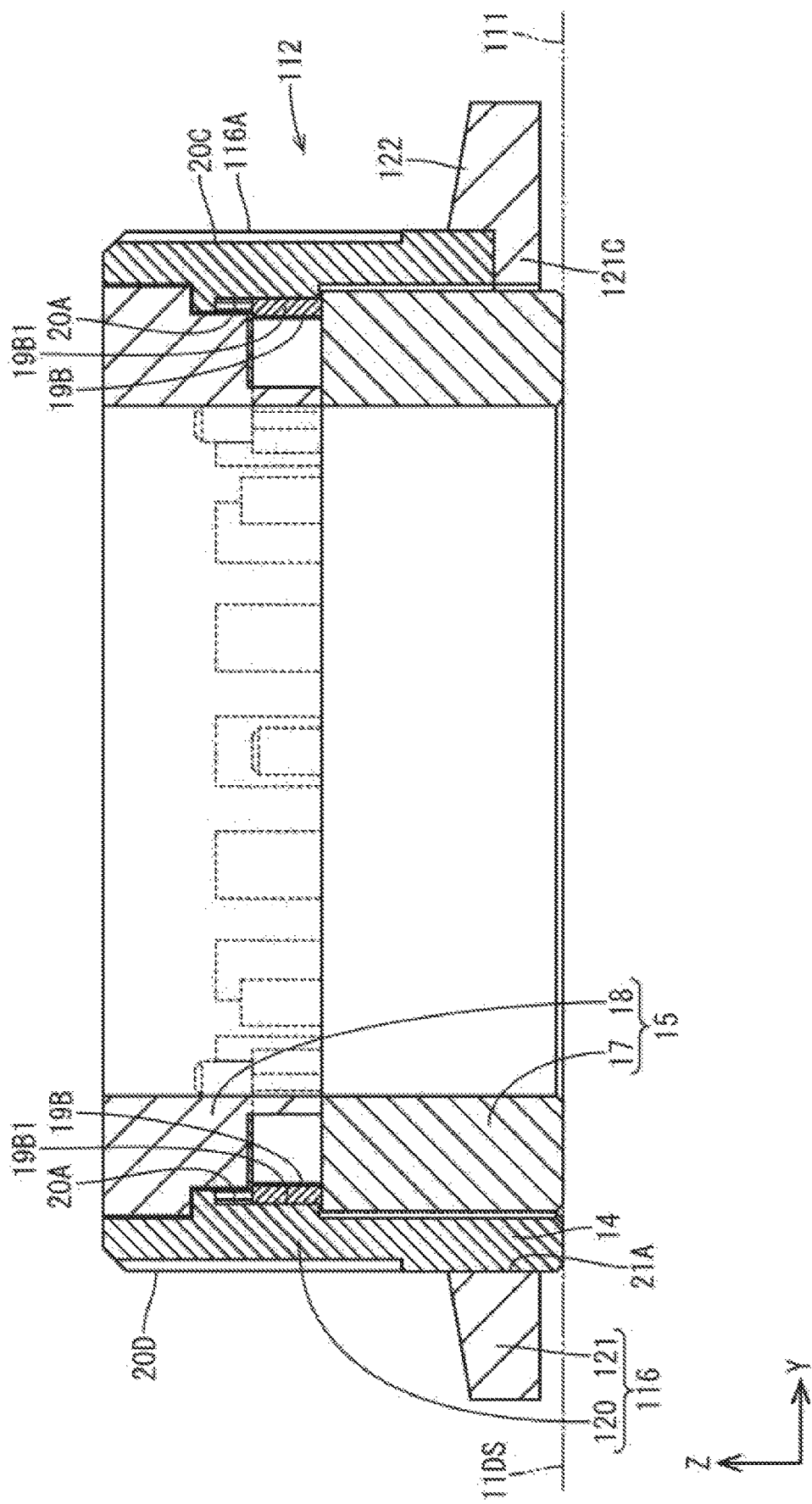
FIG. 11 is a cross-sectional view corresponding to FIG. 7.

As illustrated in FIGS. 10 and 11, the extended section 122 according to the present embodiment is integrally included in a second rotary member 121. Accordingly, a first rotary member 120 that includes an operation surface 116A does not include the extended section 122. The second rotary member 121 includes a body section 121C and the extended section 122. The body section 121C is disposed on the back side with respect to the first rotary member 120 in the Z-axis direction and between the first rotary member 120 and a liquid crystal display device 111. The extended section 122 extends laterally from the body section 121C. Thus, the extended section 122 is integrally included in the second rotary member 121 that is disposed on the liquid crystal display device 111 side with respect to the first rotary member 120 and therefore, position relation of fingers that hold an operation surface 116A and the liquid crystal display device 111 can be maintained more stably. The second rotary member 121 does not have conductivity. Therefore, even if a dial 112 is slanted and a portion of the extended section 122 is moved closer to the liquid crystal display device 111 than other portions, a position of the portion of the extended section 122 is less likely to be detected erroneously. Since the first rotary member 120 does not include the extended section 122 in the present embodiment, the second extended section 23 that is described in the first embodiment is not included.

As described above, according to the present embodiment, the rotary member 116 includes the first rotary member 120 and the second rotary member 121. The first rotary member 120 includes the operation surface 116A. The second rotary member 121 is disposed on the liquid crystal display 111 side with respect to the first rotary member 120 and fixed to the first rotary member 120. The extended section 122 is integrally included in the second rotary member 121. According to such a configuration, position relation of the first rotary member 120 and the liquid crystal display device 111 can be maintained stably by the second rotary member 121 that is disposed on the liquid crystal display device 111 side with respect to the first rotary member 120 including the operation surface and is fixed to the first rotary member 120. Since the extended section 122 is integrally included in the second rotary member 121 that is disposed on the liquid crystal liquid crystal device 111 side with respect to the first rotary member 120, the position relation of the fingers that hold the operation surface 116A and the liquid crystal display device 111 can be maintained more stably.

Third Embodiment

A third embodiment will be described with reference to FIGS. 12 to 15. In the third embodiment, structures of a fixed member 215, a rotary member 216, and a rotation detection section 214 are altered from those of the first embodiment. Configurations, operations, and effects similar to those of the first embodiment will not be described.

Figure 12:
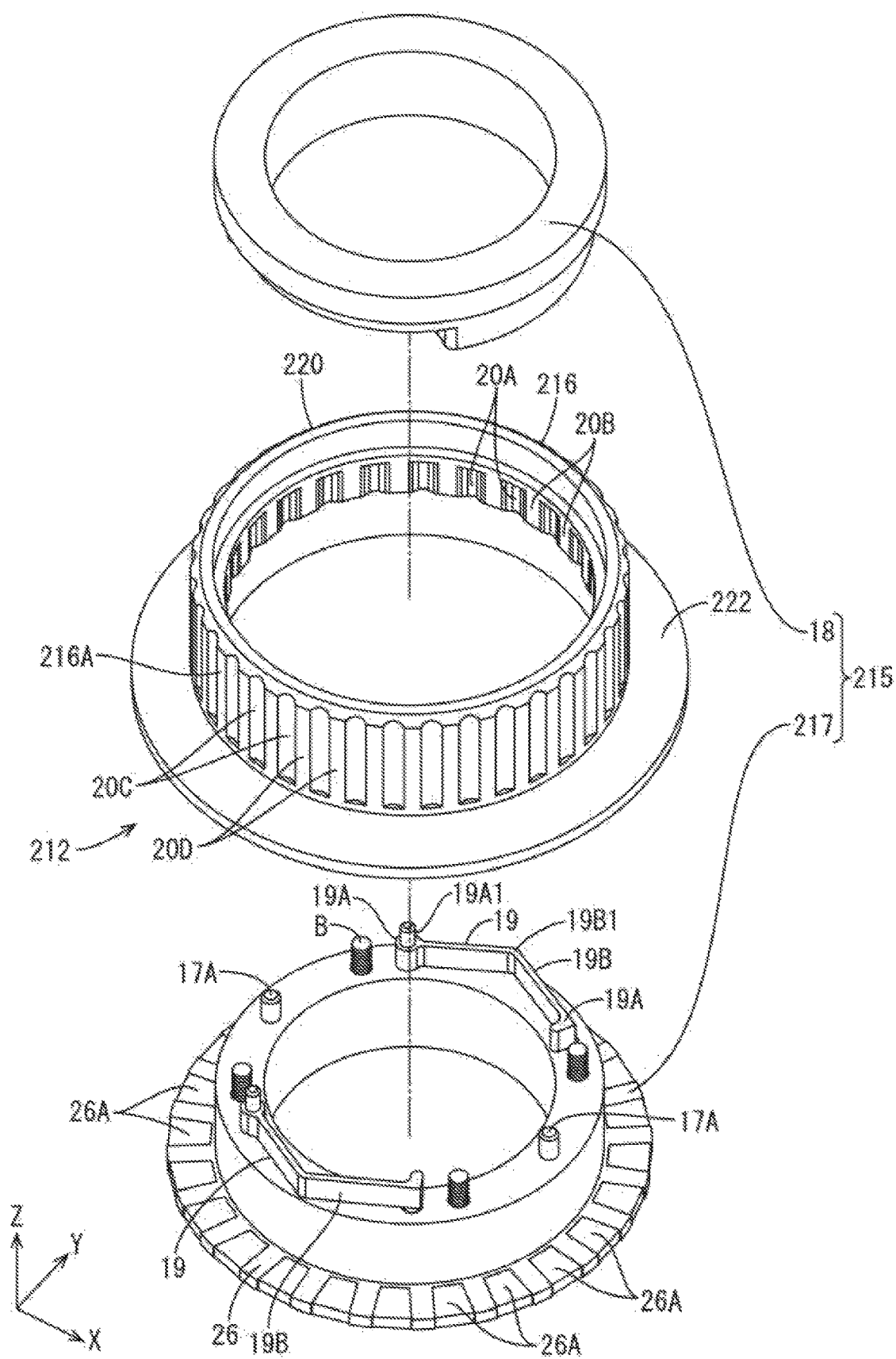
FIG. 12 is an exploded view of a dial seen from a front side according to a third embodiment.
Figure 13:
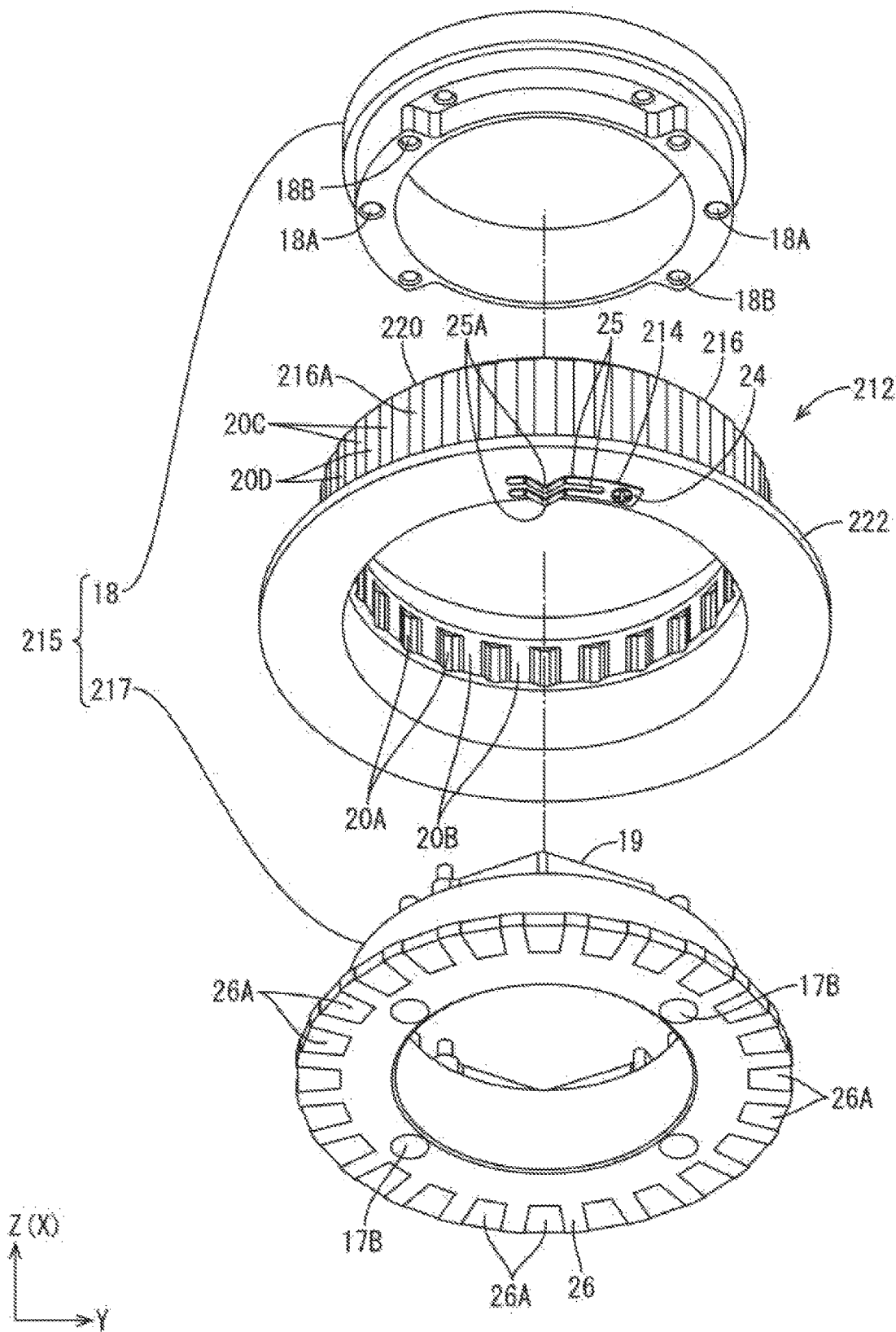
FIG. 13 is an exploded view of the dial seen from a back side.
Figure 14:
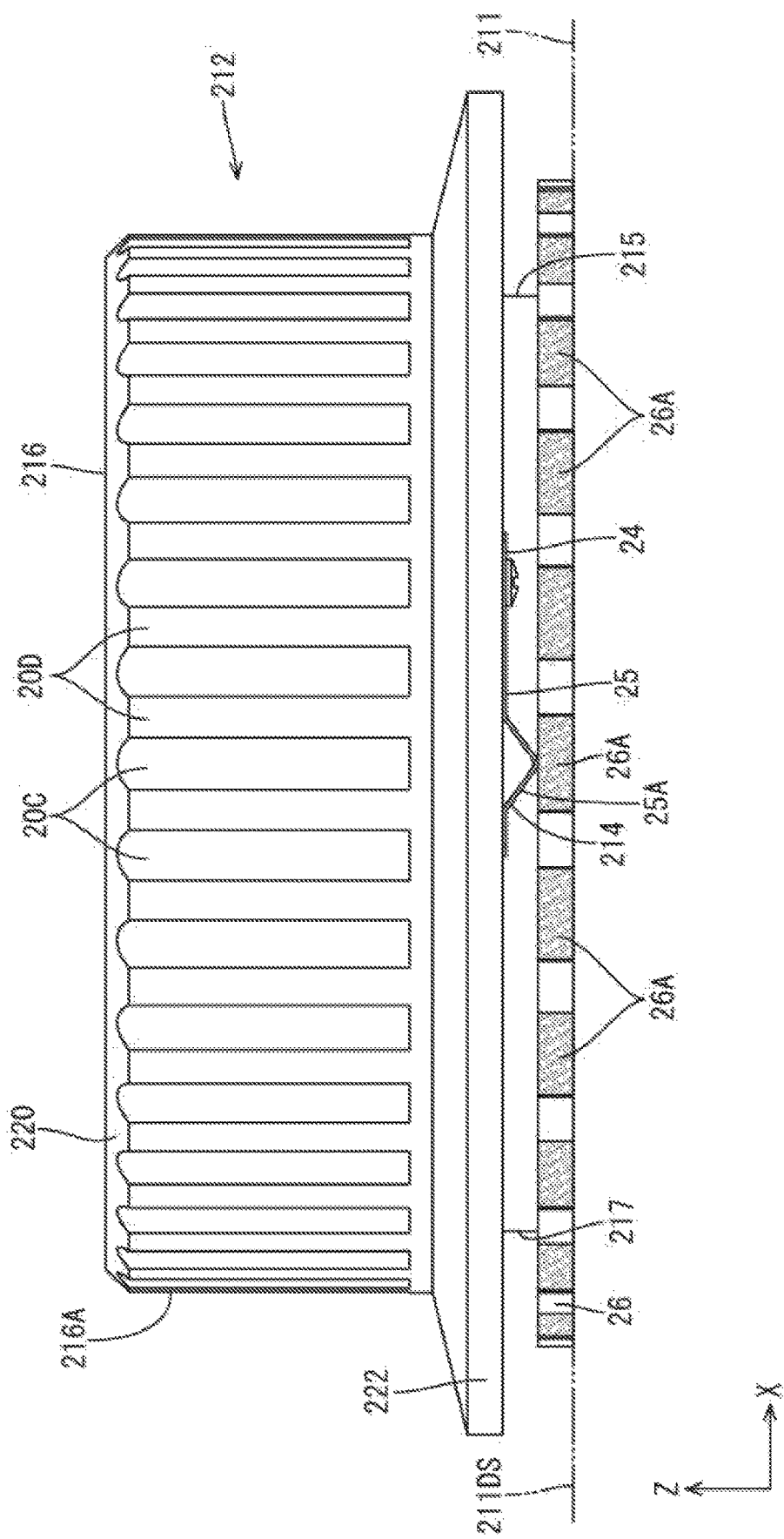
FIG. 14 is a side view of the dial.

As illustrated in FIGS. 12 and 13, the rotary member 216 according to the present embodiment include a first rotary member 220 and does not include the second rotary member 21 that is described in the first embodiment (refer FIG. 6). In such a configuration, as illustrated in FIGS. 13 and 14, the rotation detection section 214 is included as a separate component from the first rotary member 220 and is attached to the first rotary member 220. The rotation detection section 214 is formed by molding a metal plate with press molding. The rotation detection section 214 includes a base section 24 and a pair of pieces 251. The base section 24 is fixed to a back surface of the first rotary member 220 with a screw member. The pair of pieces 25 extend from the base section 24 toward one side along the back surface of the first rotary member 220. The pair of pieces 25 that are portions of the rotary detection section 214 are bent at substantially middle portions thereof in a V-shape. Each of the pieces 25 includes a spring section 25A that projects from the first rotary member 220 toward the back side (a liquid crystal display device 211 side) in the Z-axis direction. The pieces 25 includes both two end portions in an extending direction thereof and the two end portions are in contact with the back surface of the first rotary member 220. The spring sections 25A are supported in a both-end support manner by the two end portions. The spring sections 25A are supported by the two end portions of the pieces 25 so as to be elastically deformable and are moved in the Z-axis direction according to elastic deformation thereof.

Figure 15:
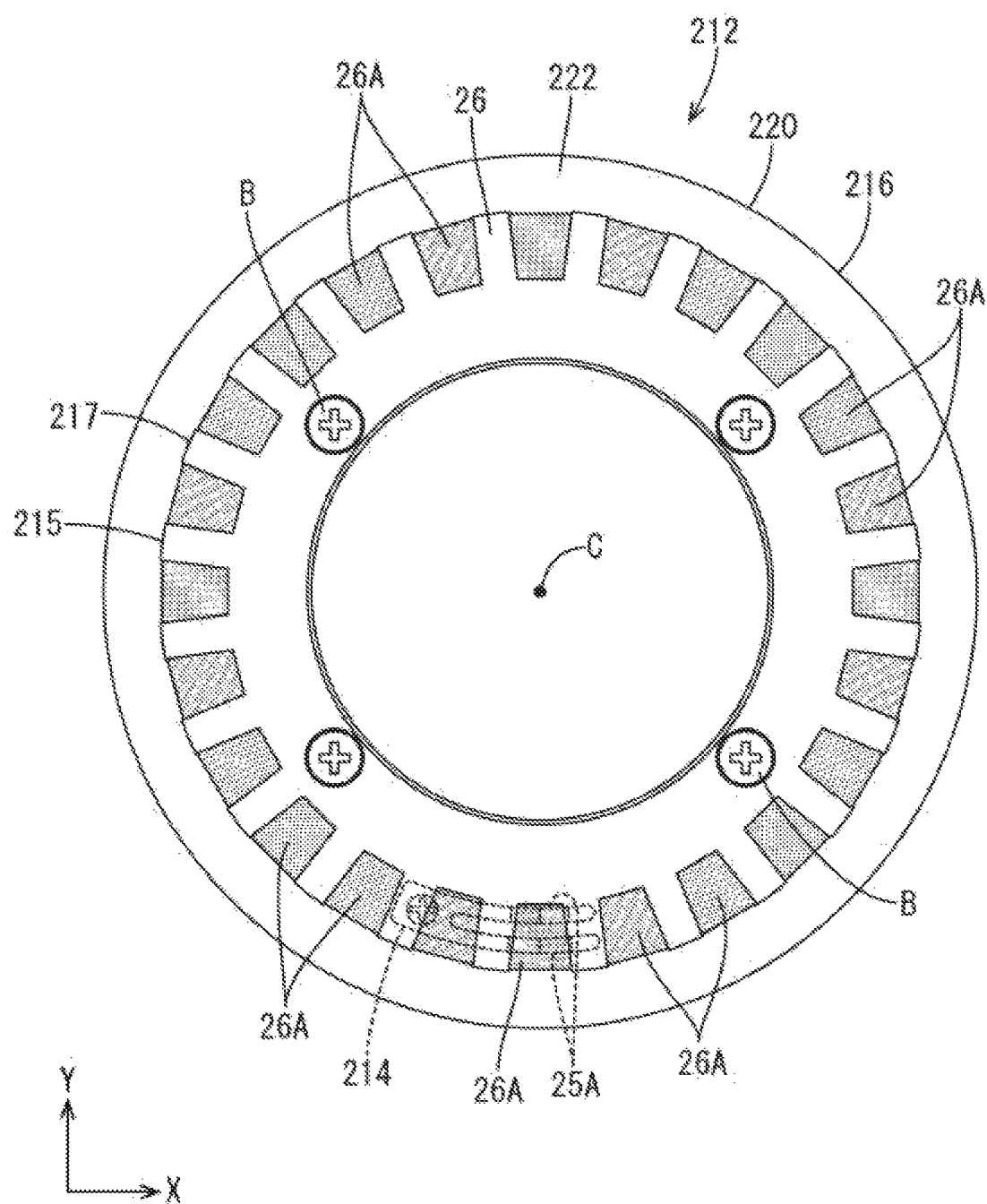
FIG. 15 is a bottom view of the dial.

As illustrated in FIGS. 12 and 13, a first fixed member 217 of the fixed member 215 includes an annular section 26 that extends in a rotation direction of the rotary member 216. The annular section 216 has an endless loop shape so as to extend over an entire periphery of an outer peripheral surface of the first fixed member 217. The annular section 216 is disposed between the first rotary member 220 and the liquid crystal display device 211 in the Z-axis direction. As illustrated in FIG. 14, the annular section 26 is disposed opposite the first rotary member 220 on a back side thereof while having a predetermined space therebetween. The space that is between the annular section 26 and the first rotary member 220 is an arrangement space where the rotary detection section 214 is disposed. As illustrated in FIGS. 14 and 15, the annular section 26 includes contact portions 26A where the spring sections 25A of the rotation detection section 214 are selectively contacted elastically. In FIGS. 14 and 15, the contact portions 26A are illustrated with shading. The contact portions 26A have conductivity and are arranged on the annular section 26 at substantially equal arrangement intervals in the rotation direction of the rotary member 216. Specifically, twenty four contact portions 26A are arranged at an arrangement angular interval of about 15 degrees. The arrangement interval of the contact portions 26A in the rotation direction of the rotary member 216 is smaller than a dimension of the contact portion 26A in the rotation direction. Each of the contact portions 26A extends from an opposing surface of the annular section 26 that is opposite the first rotary member 220, an opposing surface of the annular section 26 that is opposite the liquid crystal display device 211, and an outer side surface. However, the contact portions 26A that are adjacent to each other in the rotation direction are spaced from each other. In each of the contact portions 26A, a portion that is disposed on the opposing surface of the annular section 26 that is opposite the first rotary member 220 can be contacted with the spring sections 25A, and a portion that is disposed on the opposing surface of the annular section 26 that is opposite the liquid crystal display device 211 is contacted with a display surface 211DS. A dimension of the contact portion 26A in the radial direction is greater than a dimension of the base section 24 of the rotary detection section 214 in the radial direction. Accordingly, the pair of spring sections 25A of the rotary detection section 214 can be elastically contacted with the contact portion 26A. The contact portions 26A are electrically independent from each other. Therefore, only ones of the contact portions 26A that are selectively and elastically contacted with the spring sections 25A have a same potential as that of the rotation detection section 214. The annular section 26 on which the contact portions 26A are arranged as described above is disposed to overlap an extended section 222 of the first rotary member 220 on the back side in the Z-axis direction. The extended section 222 extends further toward outside (a lateral side) than the annular section 26 in the radial direction. Accordingly, the contact portions 26A that are disposed on the annular section 26 are covered with and protected by the extended section 222 from the front side with respect to the Z-axis direction and are less likely to be seen by a user and an outer appearance is improved.

The present embodiment has the above-described configuration and operations thereof will be described. If a user holds the rotary member 216 of a dial 212 on the operation surface 216A with user's fingers and rotates the dial 212, the rotary member 216 is rotated together with the rotation detection section 214 with respect to the fixed member 215 and the liquid crystal display device 211 as illustrated in FIGS. 14 and 15. In the rotating, the rotation detection section 214 is moved to be rotated around a center C of the rotary member 216 and accordingly, the spring sections 25A are elastically contacted with and separated from the contact portions 26A, which are arranged continuously in the rotation direction, repeatedly. Namely, a target contact portion 26A that is to be contacted with the spring sections 25A is replaced with another one sequentially with respect to the rotation condition of the rotary member 216 according to the rotation state thereof. The contact portion 26A that is elastically contacted with the spring sections 25A when the rotation of the rotary member 216 is stopped selectively has a same potential as that of the spring sections 25A. The position of the contact portion 26A that is elastically contacted with the spring sections 25A is detected by the position detecting section, which is the electrostatic capacitive type touch panel pattern, such that the position of the rotary detection section 214 is indirectly detected. The information relating a rotation state such as the number of rotation, the rotation angle, and the rotation speed of the dial 212 can be obtained by detecting the position of the rotation detection section 214 by the position detecting section. An image according to the rotation state of the dial is displayed based on the obtained information.

According to the present embodiment, as described before, the rotation detection section 214 is a separate component from the first rotary member 220 and is attached to the first rotation member 220. According to such a configuration, a shape of the rotation detection section 214 may be designed freely.

The fixed member 215 is fixed to the liquid crystal display device 211 and the rotary member 216 is mounted in the fixed member 215 so as to be rotatable. The rotation detection section 214 includes the spring sections 25A that project from the first rotary member 220 toward the liquid crystal display device 211 and are elastically deformable. The fixed member 215 includes the annular section 26 and the contact portions 26A. The annular section 26 is disposed between the first rotary member 220 and the liquid crystal display device 211 and extends in the rotation direction of the rotary member 216. The contact portions 26A are arranged at intervals in the rotation direction of the annular section 26 and have conductivity. The spring sections 25A are selectively contacted with the contact portions elastically. According to such a configuration, the rotary member 216 is held so as to be rotatable by the fixed member 215 that is fixed to the liquid crystal display device 211. The spring sections 25A of the rotary detection section 214 project from the first rotary member 220 toward the liquid crystal display device 211 and are elastically contacted with any one of the contact portions 26A that are arranged on the annular section 26 of the fixed member 215 at intervals in the rotation direction. Since the contact portions 26A have conductivity, those with which the spring sections 25A are elastically contacted have a same potential as that of the rotation detection section 214. If the spring sections 25A are relatively moved in the rotation direction with respect to the contact portions 26A according to the rotation of the rotation detection section 214 together with the rotary member 216, the spring sections 25A are elastically contacted with and separated from the contact portions 26A, which are arranged continuously in the rotation direction, repeatedly. The contact portion 26A that is elastically contacted with the spring sections 25A when the rotation of the rotary member 216 is stopped selectively has a same potential as that of the spring sections 25A. The position of the contact portion 26A that is elastically contacted with the spring sections 25A is detected by the position detecting section, which is the electrostatic capacitive type touch panel pattern, such that the position of the rotary detection section 214 is indirectly detected.

The extended section 222 is disposed to overlap the annular section 26 on an opposite side from the liquid crystal display 211 side with respect to the annular section 26 and extends laterally further than the annular section 26. Accordingly, the contact portions 26A that are disposed on the annular section 26 are covered with and protected by the extended section 222 from the opposite side from the liquid crystal display 211 side and the contact portions 26A can be protected.

Other Embodiments

The present technology is not limited to the embodiments described in the above descriptions and drawings. The following embodiments may be included in the technical scope.

(1) In each of the above embodiments, the extended section has the endless loop shape and extends along an entire periphery of the operation surface; however, the extended section may have a cutout portion in the rotation direction and may have an annular shape having ends. In such a configuration, the cutout that is formed in the extended section is preferably smaller than a dimension of a finger such that the finger does not pass through the cutout; however, it is not necessarily limited thereto. The operation surface may include multiple extended sections in portions thereof with respect to the rotation direction. In such a configuration, a space between adjacent extended sections is preferably smaller than the dimension of a finger such that the finger does not enter the space; however, it is not necessarily limited thereto.

(2) In each of the above embodiments, the rotary member (the first rotary member or the second rotary member) includes the extended section; however, the fixed member (the first fixed member or the second fixed member) may include the extended section.

(3) In each of the above embodiments, the fixed member includes the first fixed member and the second fixed member; however, the fixed member may include only one component.

(4) Other than the first and second embodiments, the number of the projections, the arrangement intervals of the projections in the rotation direction, and a plan-view size of the projection may be altered as appropriate.

(5) In the first embodiment, the second rotary member includes the second extended section; however, the second extended section may not be included.

(6) In the third embodiment, the extended section extends outward in the radial direction further than the annular section; however, an outer peripheral surface of the extended section may be on a same plane surface as an outer peripheral surface of the annular section. The extended section may be located on an inner side in the radial direction than the annular section.

(7) In the third embodiment, the rotary detection section is a separate component from the first rotary member; however, the rotary detection section may be included integrally with the first rotary member.

(8) Other than the third embodiment, a specific configuration of the rotation detection section may be altered as appropriate. For example, the number of the pieces and the spring sections may be one or three. Only one end portion of the respective pieces in the extending direction may be contacted with the first rotary member and the spring sections may have a cantilever support structure.

(9) Other than the third embodiment, the number of contact portions of the annular section, the interval between the contact portions in the rotation direction, and the plan view size of the contact portion may be altered as appropriate.

(10) In each of the above embodiments, the latch member has a both end support structure but may have a cantilever support structure.

(11) In each of the above embodiments, the number of latch members is two but may be one, three, or more than three.

(12) In each of the above embodiments, the touch panel pattern is a self-capacitive type that is one type of the projected capacitive touch panel pattern; however, the touch panel pattern may be a mutual capacitive type that is another type of the projected capacitive touch panel pattern. A plan-view shape of the touch electrode that is included in the touch panel pattern may be shapes other than a diamond shape and the shapes may be a square, a circle, or a polygonal shape such as pentagon or a polygonal shape having more than five corners.

(13) Each of the above embodiments includes a projected capacitive touch panel pattern; however, a surface capacitive type touch panel pattern may be used.

(14) Each of the above embodiments includes a electrostatic capacitive type touch panel pattern; however, the touch panel pattern may not be the electrostatic capacitive type and may be a resistive type, an optical type, and ultrasonic type.

(15) In each of the above embodiments, the liquid crystal display device includes the cover glass; however, the liquid crystal display may not include the cover glass. In such a configuration, the touch panel pattern is preferably mounted in the liquid crystal panel in a built-in manner. However, the touch panel may be disposed on the front side with respect to the liquid crystal panel and the touch panel may include a touch panel pattern.

(16) In each of the above embodiments, the input detecting device (the liquid crystal display device) has a laterally elongated rectangular plan-view shape; however, a plan-view shape of the input detecting device may be a quadrangular shape, a square, an elongated circular shape, an oval, a circle, a trapezoidal shape, or a shape having a curved surface.

(17) Other than each of the above embodiments, a specific usage of the input detecting device may be altered as appropriate.

(18) In each of the above embodiments, the liquid crystal display device that includes the liquid crystal panel is described as the embodiments. However, display devices that include other types of display panels (e.g., plasma display panels (PDP), organic EL panels, electrophoretic display panels (EPD), and micro electro mechanical system (MEMS) display panels) are also included in the technical scope.

The invention claimed is:

1. An input detecting device comprising:
    an input section where position input is performed;
    a position detecting section included in the input section and detecting an input position regarding at least the position input;
    a rotary member mounted on the input section so as to be rotatable and including an operation surface on an outer peripheral surface thereof with which a rotating operation is performed;
    a rotation detection section that is rotatable together with the rotary member with respect to the input section and a position of which is detected by the position detecting section;
    an extended section extending laterally from the operation surface so as to be disposed between the operation surface and the input section;
    a fixed member that is fixed to the input section and where the rotary member is mounted to be rotatable; and
    a latch member including a pair of support portions that are fixed to the fixed member, and an arm portion that connects the pair of support portions, wherein
    the arm portion has a substantially plan view V-shape, and includes a contact portion at a V-shaped protruding portion,
    the contact portion is contacted with an inner peripheral surface of the rotary member,
    the inner peripheral surface of the rotary member has recesses and projections that are arranged alternately in a rotation direction of the rotary member, and
    when the rotary member rotates, the contact portion slides on the recesses and the projections such as latch sound is created.

2. The input detecting device according to claim 1, wherein
    the rotary member includes a first rotary member and a second rotary member, the first rotary member has the operation surface, and the second rotary member is disposed on an input section side with respect to the first rotary member and fixed to the first rotary member, and
    the extended section is integrally included in the first rotary member.

3. The input detecting device according to claim 2, wherein the second rotary member integrally includes a second extended section that is sandwiched between the extended section and the input section.

4. The input detecting device according to claim 1, wherein the rotary member includes a first rotary member and a second rotary member, the first rotary member has the operation surface, and the second rotary member is disposed on an input section side with respect to the first rotary member and fixed to the first rotary member, and the extended section is integrally included in the second rotary member.

5. The input detecting device according to claim 1, wherein the extended section is formed in an endless loop form so as to extend over an entire periphery of the operation surface.

6. The input detecting device according to claim 1, wherein the fixed member includes a first fixed member and a second fixed member, the first fixed member is disposed on an input section side with respect to the latch member, and the second fixed member and the first fixed member sandwich the latch member therebetween.

7. An input detecting device comprising:
an input section where position input is performed;
a position detecting section included in the input section and detecting an input position regarding at least the position input;
a rotary member mounted on the input section so as to be rotatable and including an operation surface on an outer peripheral surface thereof with which a rotating operation is performed;
a rotation detection section that is rotatable together with the rotary member with respect to the input section and a position of which is detected by the position detecting section;
an extended section extending laterally from the operation surface so as to be disposed between the operation surface and the input section;
a fixed member that is fixed to the input section and where the rotary member is mounted to be rotatable; and
a latch member including a pair of support portions that are fixed to the fixed member, and an arm portion that connects the pair of support portions, wherein
the arm portion has a substantially plan view V-shape, and includes a contact portion at a V-shaped protruding portion, the contact portion is contacted with an inner peripheral surface of the rotary member,
the position detecting section includes an electrostatic capacitive type touch panel pattern,
the rotary member includes a first rotary member that includes the operation surface and has conductivity, and a second rotary member that is disposed on an input section side with respect to the first rotary member and is fixed to the first rotary member the second rotary member has no conductivity,
the rotation detection section has conductivity and is electrically connected to the first rotary member, the rotation detection section projects further toward the input section than the second rotary member, and the second rotary member includes at least one projection that projects toward the input section, and the at least one projection having no conductivity and the rotation detection section having conductivity are disposed to fill a space between the second rotary member and the input section, and support the rotary member.

8. The input detecting device according to claim 7, wherein the rotation detection section is integrally included with the first rotary member.

9. The input detecting device according to claim 8, wherein
the second rotary member includes a hole that opens toward the input section and the first rotary member, and the rotation detection section projects from a portion of the first rotary member toward the input section and is arranged in the hole.

10. The input detecting device according to claim 7, wherein the rotation detection section is a separate component from the first rotary member and is mounted on the first rotary member.

11. The input detecting device according to claim 10, further comprising a fixed member that is fixed to the input section and to which the rotary member is mounted so as to be rotatable, wherein
the rotation detection section includes a spring section that projects from the first rotary member toward the input section and is elastically deformable, and the fixed member includes an annular section and contact portions, the annular section is disposed between the first rotary member and the input section and extends along a rotation direction of the rotary member, and the contact portions are arranged on the annular section at intervals in the rotation direction and have conductivity, and the spring section is selectively and elastically contacted with the contact portions.

12. The input detecting device according to claim 11, wherein the extended section overlaps the annular section on an opposite side from the input section and extends laterally further than the annular section.

13. The input detecting device according to claim 7, wherein
projected distal end surfaces of the at least one projection are substantially on a same plane surface as a projected distal end surface of the rotation detection section.

14. The input detecting device according to claim 7, wherein
the at least one projection and the rotation detection section are spaced from each other at equal angular intervals in the rotation direction.

* * * * *